United States Patent [19]

Stanley

[11] Patent Number: 4,641,421
[45] Date of Patent: Feb. 10, 1987

[54] METHOD OF FORMING AND INSTALLING FIELD WINDINGS

[75] Inventor: Louis Stanley, New South Wales, Australia

[73] Assignee: Card-O-Matic Pty. Limited, New South Wales, Australia

[21] Appl. No.: 774,248

[22] Filed: Sep. 9, 1985

Related U.S. Application Data

[62] Division of Ser. No. 587,306, Mar. 7, 1984, Pat. No. 4,594,775.

[30] Foreign Application Priority Data

Mar. 31, 1983 [AU] Australia .................................. 8708

[51] Int. Cl.⁴ ............................................ H02K 15/06
[52] U.S. Cl. ........................................ 29/596; 29/606
[58] Field of Search ................ 29/596, 606, 734, 736, 29/732

[56] References Cited

U.S. PATENT DOCUMENTS 4,416,058 11/1983 Henry, Sr. et al. .................. 29/734

Primary Examiner—Carl E. Hall
Attorney, Agent, or Firm—Ladas & Parry

[57] ABSTRACT

A method of inserting field windings in the core of an axial flux induction electric machine, the method includes providing a former about which wire is wound to form a plurality of convolutions, aligning the former with a radial face of the core and then moving the convolutions from the former into slots in the radial face to thereby form a field winding.

13 Claims, 15 Drawing Figures

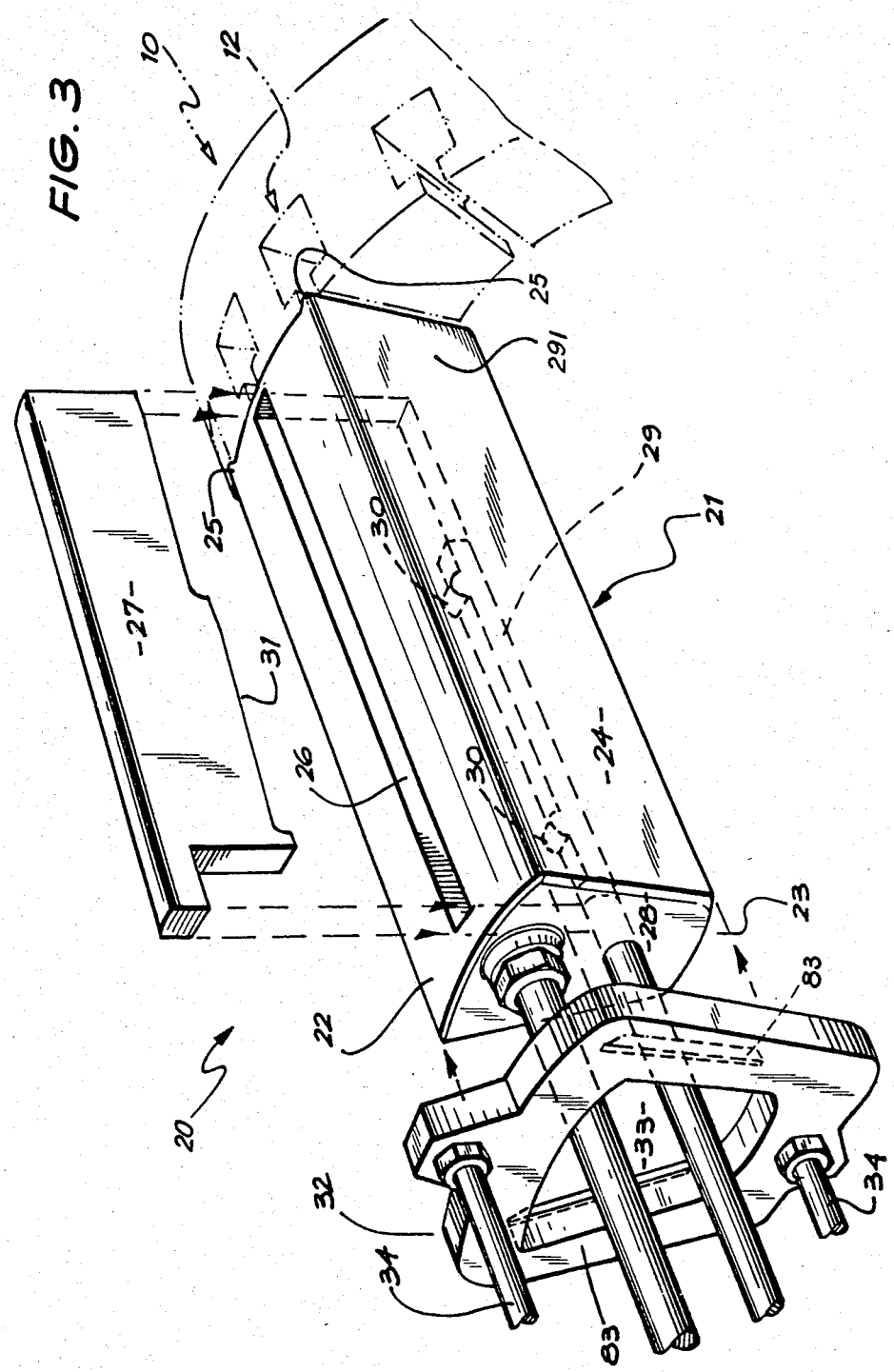

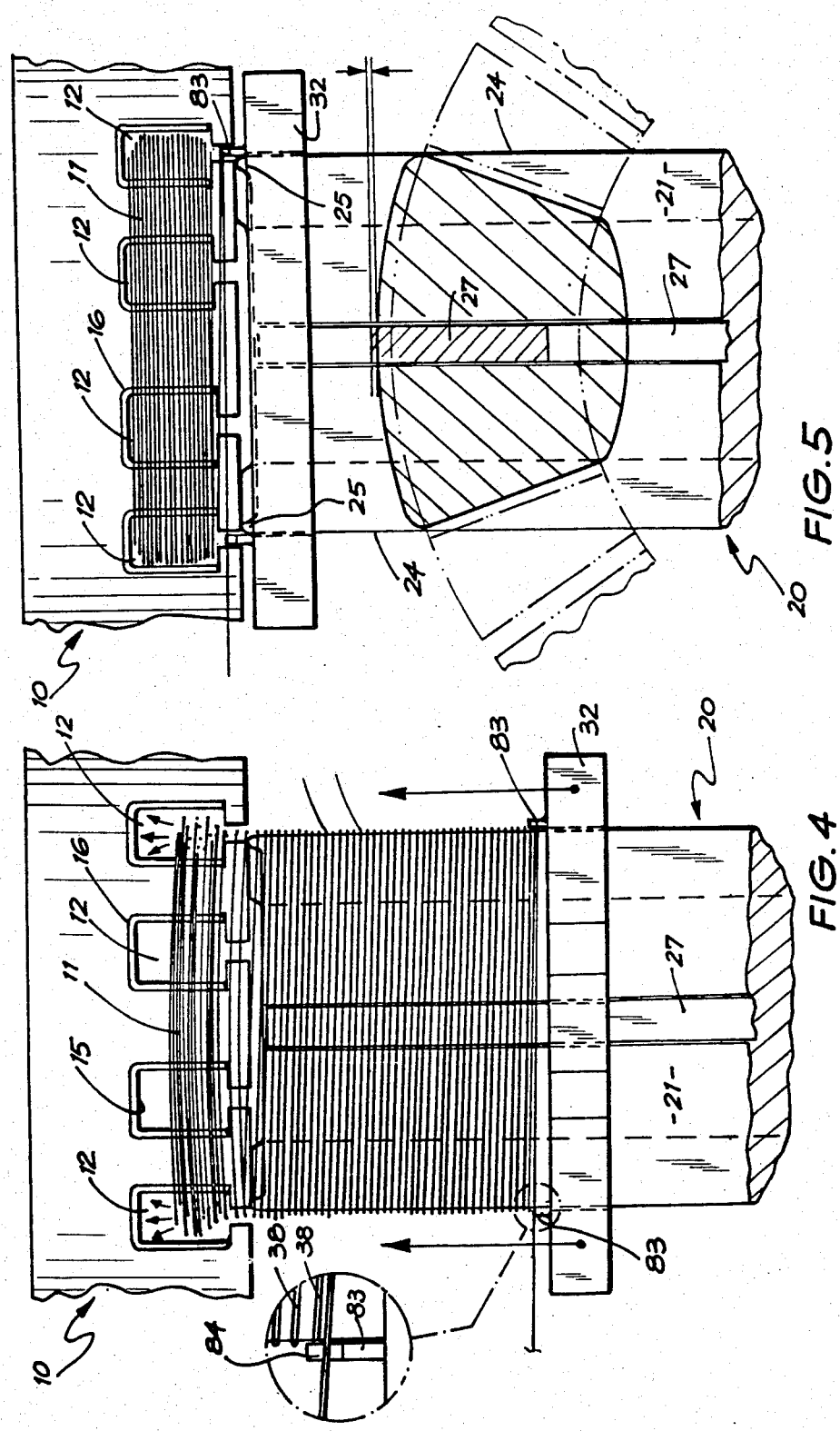

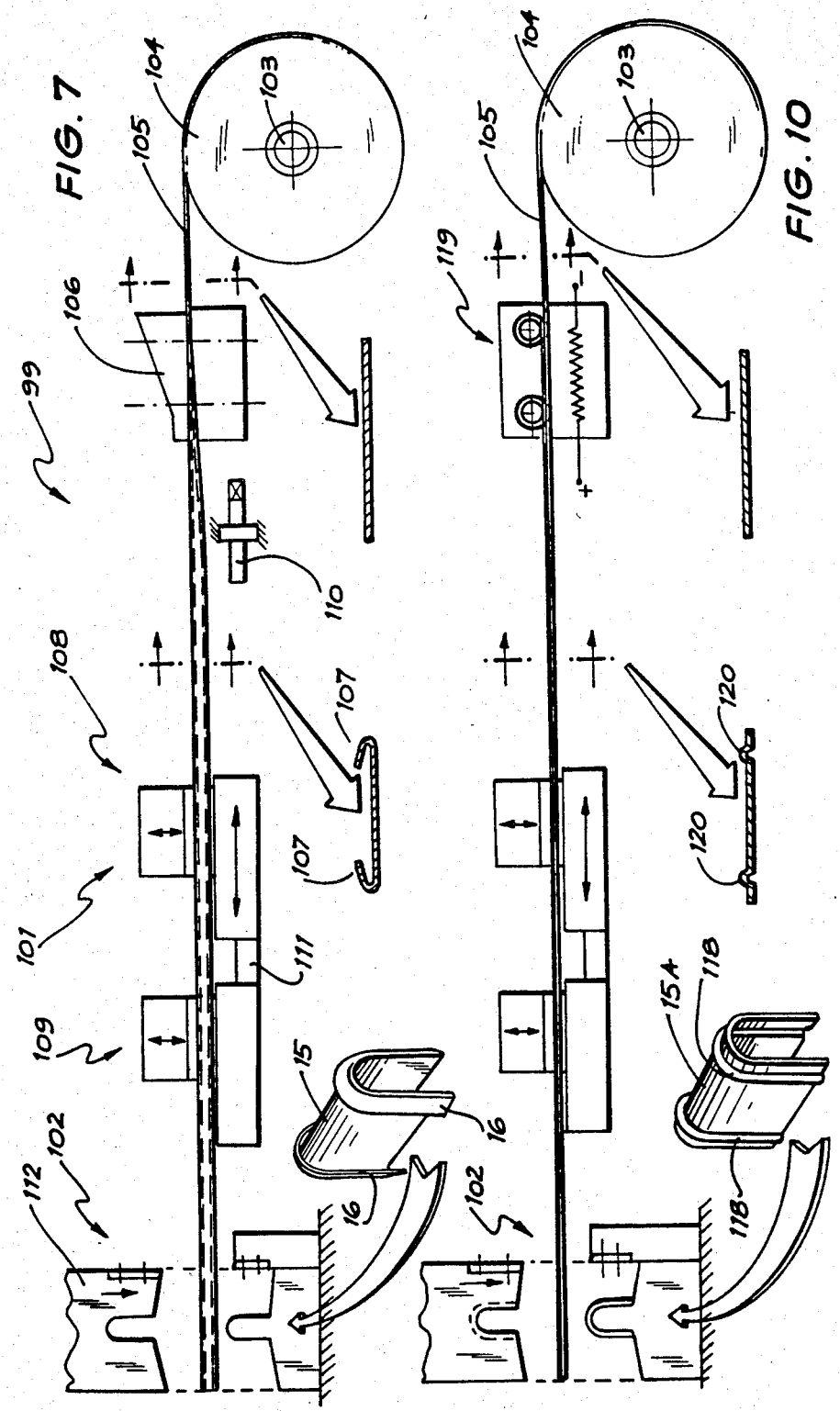

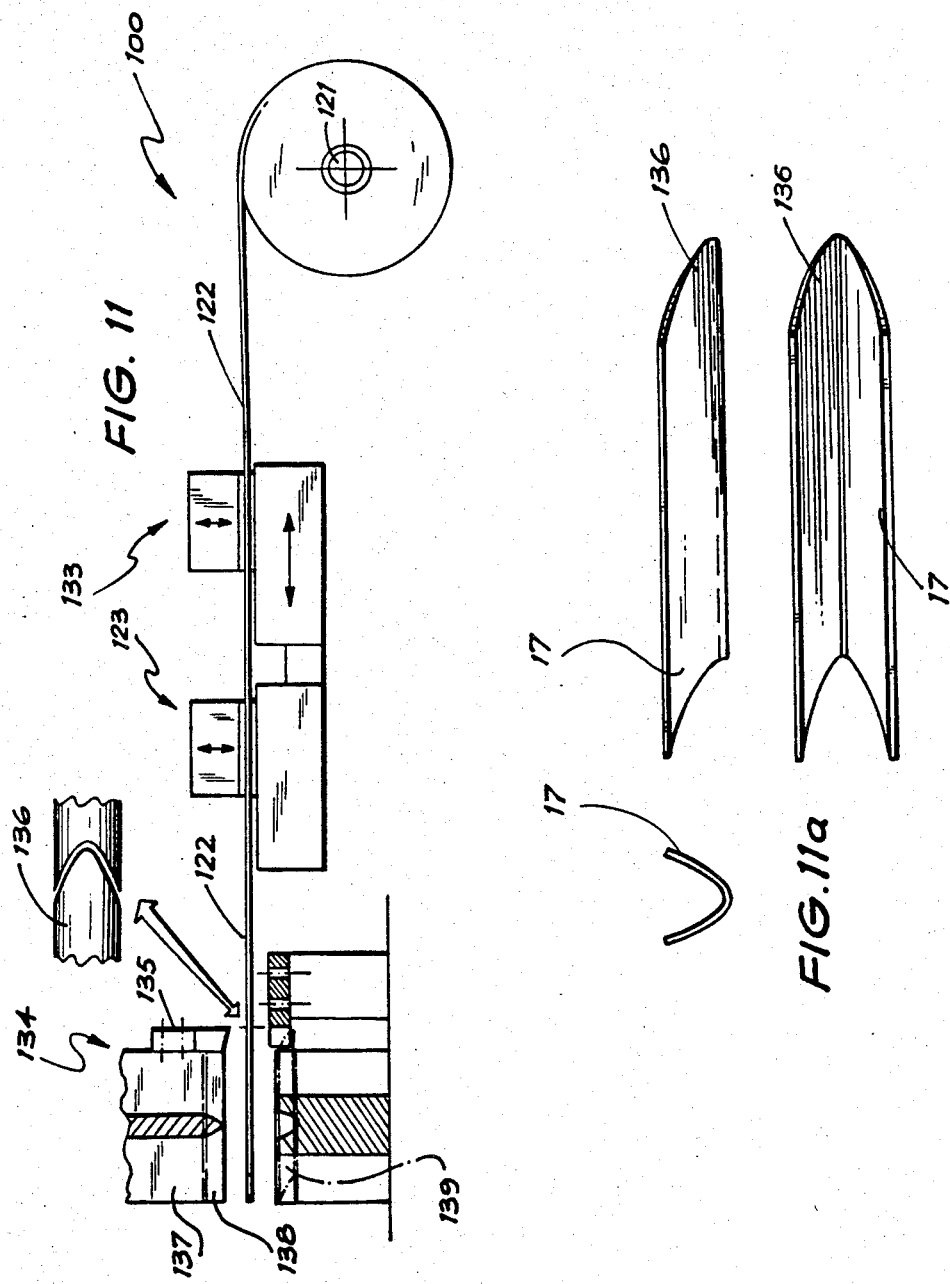

METHOD OF FORMING AND INSTALLING FIELD WINDINGS

This application is a divisional application of copending application Ser. No. 587,306 filed on Mar. 7, 1984 now U.S. Pat. No. 4,594,775.

The present invention relates to induction electric machines and more particularly to the insertion of field windings in induction electric machines.

Axial flux induction electric machines, and methods for the manufacture thereof, are described in U.S. Pat. Nos. 4,320,645 and 4,410,820. The axial flux induction electric machines described in these two U.S. Patents employ wound cores manufactured from metal strip. The metal strip is punched so as to form radially extending slots within which field windings may be located. Traditionally these field windings have been wound manually in the slots. However one attempt to automate the process is described in U.K. Patent Application No. 8 125 787 (Australian Application No. 74445/81). This attempt to automate the process of inserting the field windings was very time consuming and not totally acceptable in a production line situation. The manual method of winding the field windings is also very time consuming and therefore costly.

It is the object of the present invention to overcome or substantially ameliorate the above disadvantages.

There is disclosed herein an apparatus to form and install field windings in a core of an induction electric machine, said apparatus comprising:
support means to receive and hold the core, said core having slots to receive field windings of the machine, a field winding former about which wire to form field windings is spirally wound, said former having a shape so that convolutions of the wire on the former can pass therefrom into said slots, and press means movable along the former so as to move the wire convolutions from the former into the core so that the convolutions pass into the slots to form a field winding.

There is further disclosed herein a method of forming and installing field windings in a core of an induction electric machine, said method including the steps of supporting the core, said core having slots to receive field windings of the machine, winding a length of wire about a former so that convolutions of the wire can pass from the former into said slots, and moving the convolutions from the former onto the core so that the convolutions pass through the slots to form field windings.

A preferred form of the present invention will now be described by way of example with reference to the accompanying drawings wherein:

FIG. 3 is a schematic part exploded view of a former about which the field windings of FIGS. 1 and 2 are wound;

FIG. 4 is a schematic plan view of a field winding formed on the former of FIG. 1 and being inserted in a core as illustrated in FIG. 1;

FIG. 5 is a schematic plan view of the former of FIG. 1, with cross-section shown, with the field winding inserted in the slots of the core of FIG. 1;

FIG. 7 is a schematic side elevation of the apparatus and method to form the insulation members 15 used in the core of FIG. 1;

FIG. 10 is a schematic side elevation of an apparatus and method of forming an alternative insulation member to that of FIG. 7;

FIG. 11 is a schematic side elevation of the apparatus and method of forming insulation wedges to be inserted in the core of FIG. 1;

FIG. 11a is a schematic side elevation plan and end elevation of the insulation wedges formed by the apparatus and method of FIG. 11;

Figure 1:
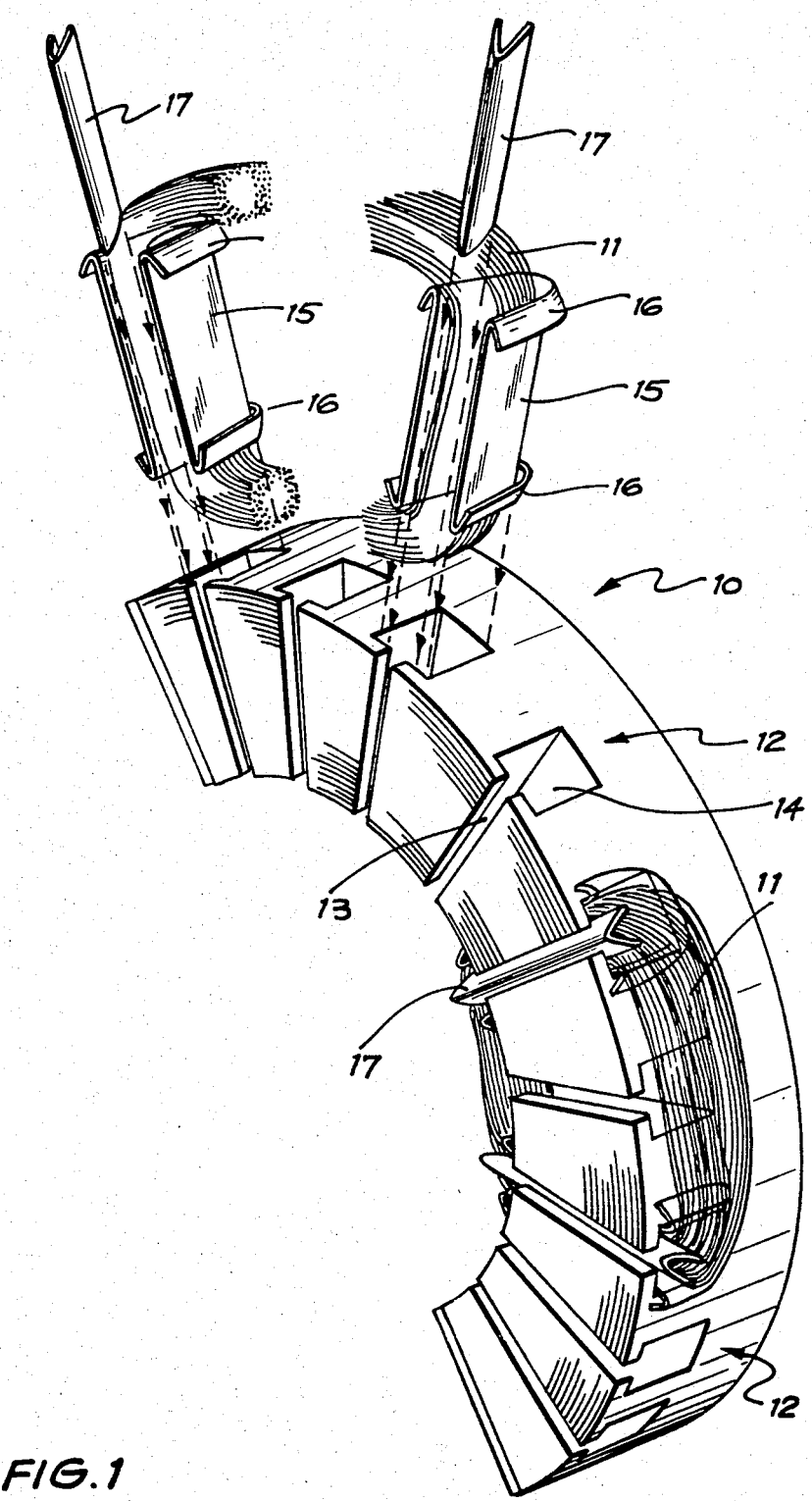
FIG. 1 is a schematic perspective view of a core of an axial flux induction electric machine having radial slots within which field windings are located.

In FIG. 1 there is schematically depicted a core 10 of an axial flux induction electric machine. Preferably the core 10 with its field windings 11 would form a stator of an axial flux induction electric motor or dynamo. However it should also be appreciated that the core 10 and its field windings 11, could be used in a transformer or other electro-magnetic devices. The core 10 is manufactured from a strip of metal punched at longitudinally spaced locations and wound about a central axis extending generally transverse of the strip so that the holes punched in the strip form radially extending slots 12. The core 10 may be manufactured by the method and apparatus described in the above-mentioned earlier U.S. patents. The slots 12 have a neck 13, communicating with a larger slot portion 14, through which the field windings 11 pass. Located within each larger slot portion 14 is an insulating member 15 which surrounds the portion of the field winding 11 located within the slots 12. Insulating members 15 are formed of flexible plastics material and are bent so as to form a generally U-shaped configuration with end cuffs 16. The cuffs 16 abut the radially outer and radially inner longitudinal faces of the core 10. To hold the field windings 11 within the slots 12 and to fully insulate the field windings 11, there are provided insulating wedges 17. The insulating wedges 17 are located within the larger slot portions 14 so as to abut the inner portions of the necks 13. The insulating wedges 17 are formed of flexible plastics material, similar to that forming the members 15. The wedges 17 form a generally V-shaped configuration and are forced under their own resilience against the neck 13.

Figure 2:
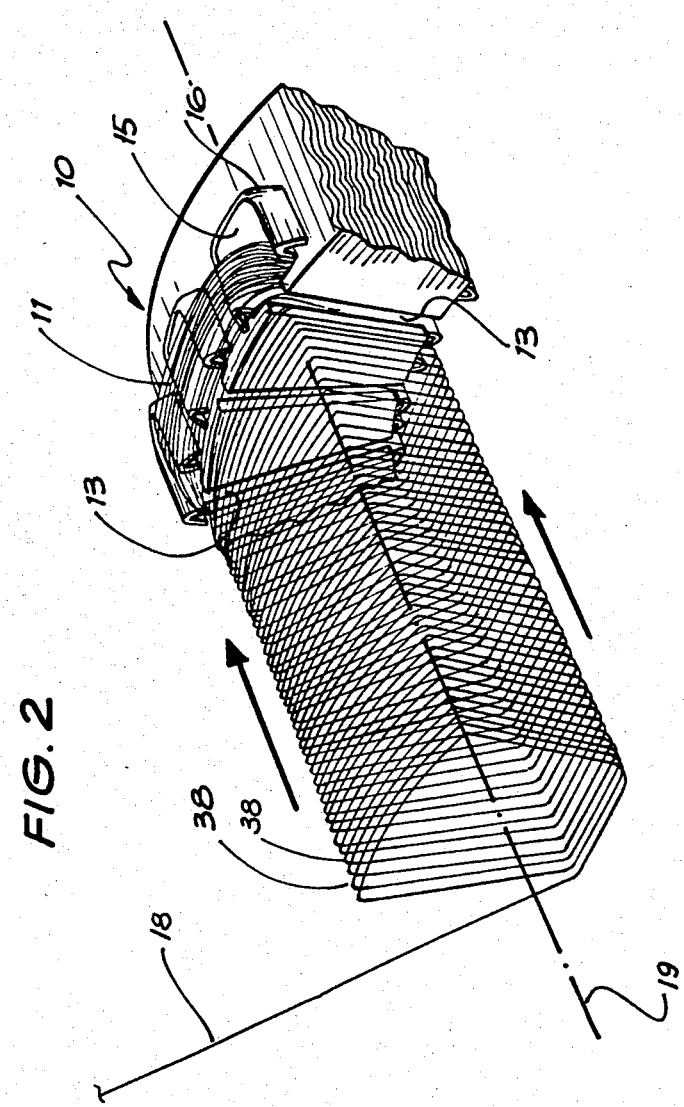
FIG. 2 is a schematic perspective view of the formation and insertion of the field windings of the machine of FIG. 1.

Turning now to FIG. 2, there is schematically depicted the method by which the field windings 11 are formed and inserted in the slots 12. A length of wire 18 is wound about an axis 19 so as to form a shape which allows the turns or convolutions 38 of the wire to pass through the necks 13 of two of the slots 12. Upon formation of the convolutions 38, the convolutions 38 are moved along the axis 19 relative to the core 10 so as to pass through the necks 13 to be located in the larger slot portions 14. Once the convolutions 38 are located within the slots 12 the insulating wedges 17 are then located in position by either being inserted through the necks 13 or lengthwise along the slots 12.

In FIG. 3 there is schematically depicted a former 20 about which the wire 18 is wound to form the convolutions 38. The former 20 includes a former body 21 which is shaped so as to have two convex arcuate surfaces 22 and 23 and sides 24. One end of the body 21 is provided with ridges 25 which engage the edges of the necks 13 to aid in correctly locating the former 20 in a position aligned with the selected slots 12. The body 21 is also formed to have a longitudinal slot 26 within which there is slidably located an expander member 27. In operation, it has been found advantageous to, in effect, decrease the operative size of the former 20 when the convolutions 38 are being moved along the former body 21. In the present instance, this has been achieved by retracting the expander member 27 from a position projecting from the slot 26, when the convolutions 38 are being formed, to a position projecting less fully from the member 27 or even to a position located entirely within (or flush with) the body 21, when the convolutions 38 are being moved along the former 21 into the slots 12. However this may be achieved by means such as tapering the body 21 from the end 28 to the end 291. That is to say the end 28 of the body 21 would have a larger cross-sectional area than the cross-sectional area of the end 291. Accordingly as the convolutions 38 move along the body 21 they would automatically loosen their contact with the former 20.

In the present instance, the expander member 27 is moved by means of a cam member 29 which is movable longitudinally of the former body 21 and located at least partly therein. The cam member 29 has cam ridges 30 which cooperate with a cam face 31 formed on the inner end of the expander member 27. The cam member 29 is movable longitudinally of the former body 21 so as to cause movement of the expander member 27 by interaction of the ridges 30 and cam face 31. It can also be preferable to resiliently bias the expander member 27 into contact with the cam member 29 by means of springs. The cam member 29 can be movable longitudinally of the body 21 by pneumatic or hydraulic cylinders.

Located about but slidable along the former 20 is a press member 32. The press member 32 is hollow so as to have a central opening 33 of substantially the same configuration as the transverse cross-section of the former 20 so as to be slidably movable therealong. The press member 32 may be movable along the former 20 by means of shafts 34 extending from hydraulic or pneumatic cylinders. In operation of the former 20, the expander member 27 is located in a position protruding from the slot 26. Thereafter the wire 18 is wound around the former 20 to form the convolutions 38. Thereafter the former 20 is located so that the ridges 25 abut the core 10 so that the sides 24 are aligned with the necks 13 of two slots 12. Thereafter the expander member 27 is retracted inwardly of the body 21 to loosen the engagement of the convolutions 38 with the body 21. Thereafter the press member 32 is moved along the body 21 toward the end 291 pushing the convolutions 38 along the body 21 and into the slots 12 via the necks 13. This sequence of operations is schematically depicted in FIGS. 4 and 5. However it should be particularly noted from FIG. 5, that the transverse cross-section of the body 21 has a configuration which cooperates with an angular segment of the core 10 extending between two slots 12 which are to receive the field windings 11.

Figure 6A:
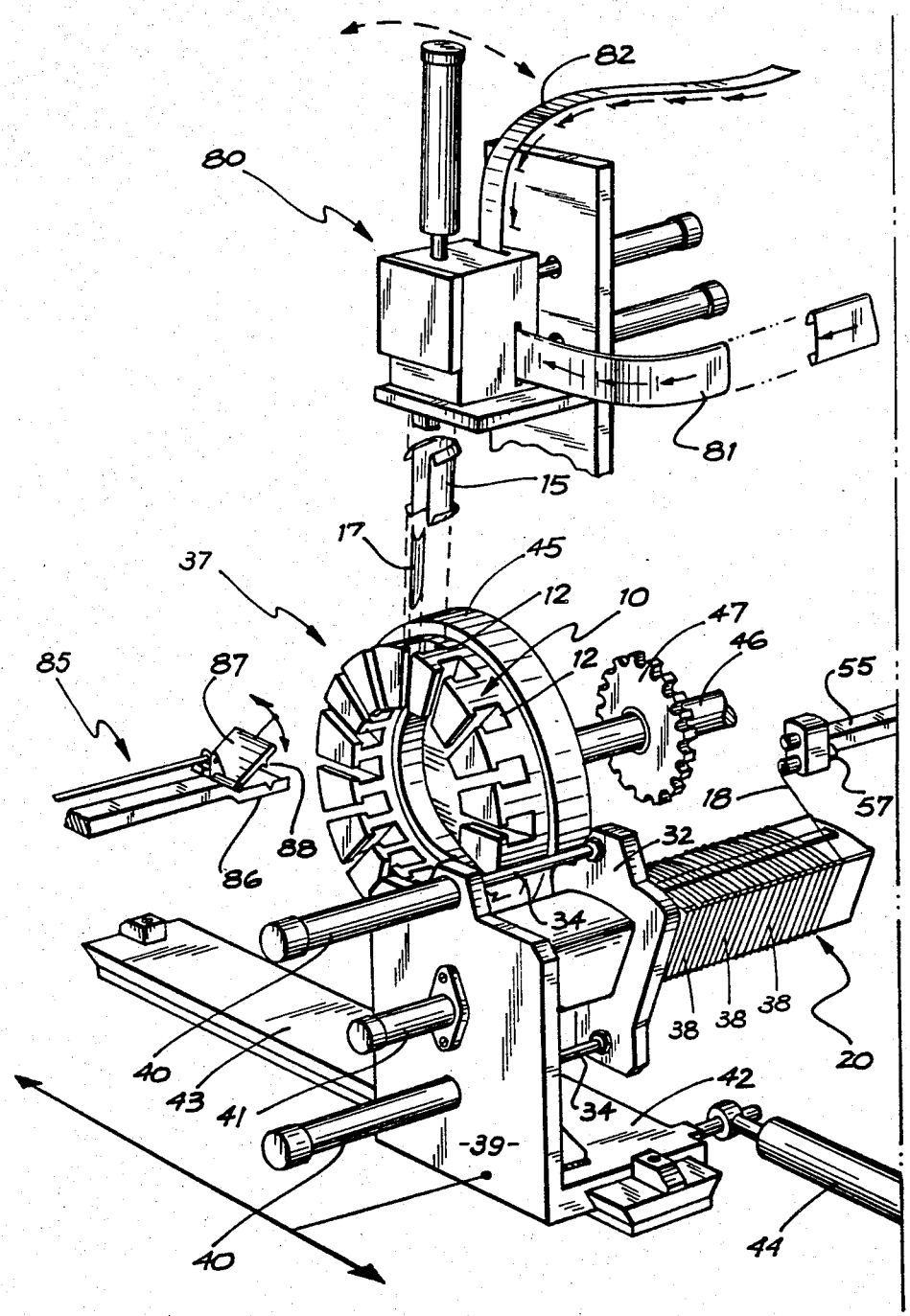
FIGS. 6a and 6b are schematic perspective views of an apparatus employing the former of FIGS. 3, 4 and 5, which apparatus has a winding assembly to wind the wire on the former.
Figure 6B:
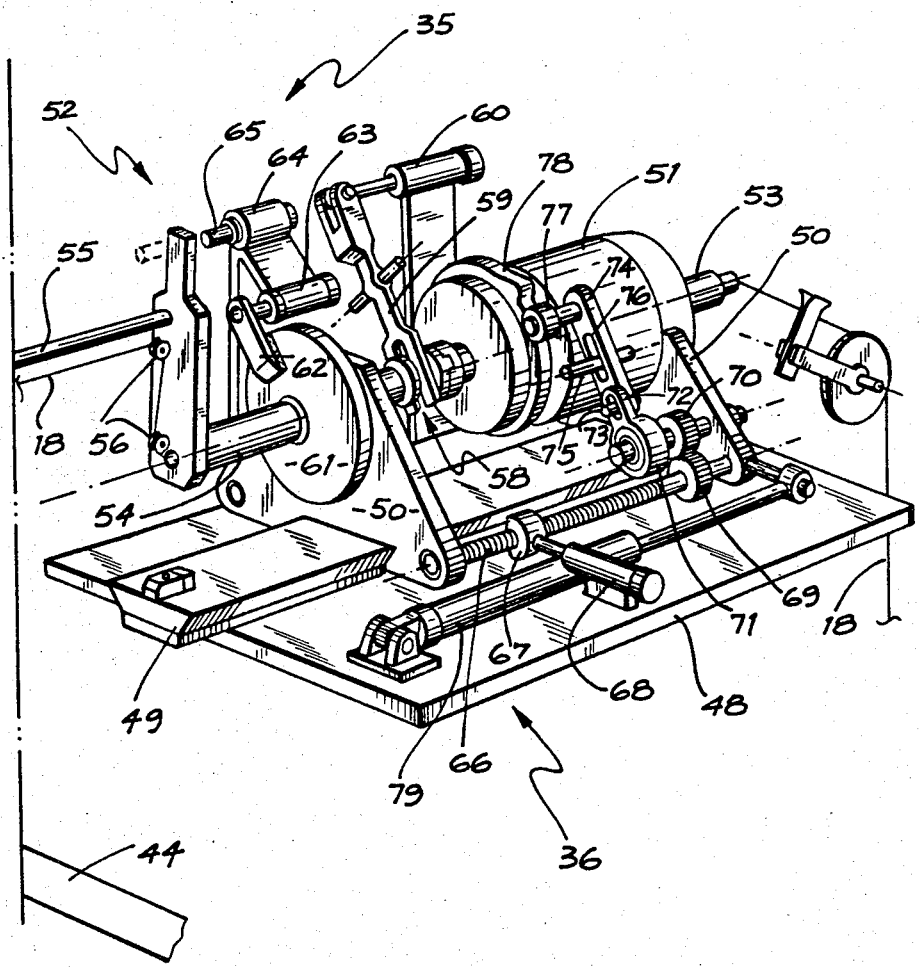

Turning now to FIGS. 6a and 6b wherein there is schematically depicted an apparatus 35 which employs the method of inserting field windings as described with reference to FIGS. 1 to 5. The apparatus 35 includes a winding assembly 36 and a transfer assembly 37. The winding assembly 36 receives the wire 18 and winds it around the former 20 to form the convolutions 38. The transfer assembly 37 includes the former 20 together with a support 39 therefor. The support 39 also receives two hydraulic cylinders 40 which move the shafts 34. There is also provided a hydraulic cylinder 41 which moves the cam member 29. The body 21 of the former 20 is fixed directly on one side of the support 39. The support 39 is fixed directly to a base 42 which is slidably mounted on a track 43. Attached to the base 42 is a hydraulic cylinder 44 which moves the base 42 longitudinally of the track 43. Upon the convolutions 38 being completed, the former 20 is moved by operation of the cylinder 44 to a position whereby the former 20 is aligned with slots 12 on the core 10. Upon this alignment being completed, the expander member 27 is retracted and the press member 32 operated to move the convolutions 38 from the former 20 into the slots 12 of the core 10.

The core 10 is mounted on backing member 45 fixed to a shaft 46. The shaft 46 is provided with an indexing wheel 47 which rotates the core 14 to the desired location so that the correct slots 12 receive the convolutions 38.

The winding assembly 36 includes a base 48 having a rail 49. Slidably mounted on the rail 49 are two sub-frames 50 which support an electric motor 51 and winding arm assembly 52. The motor 51 has a hollow shaft 53 which is aligned with a hollow shaft 54 of the winding arm assembly 52. Fixed to the shaft 54 at a distance spaced radially from the axis thereof is an arm 55. The wire 18 is fed to the hollow shaft 53 to pass therethrough and exit via the hollow shaft 54. From there the wire 18 is fed around two rollers 56 which deliver the wire 18 to a tube 57 (FIG. 6A) wherefrom the wire 18 passes to be wound around the former 20. The shaft 54 is selectively couplable to the shaft 53, so as to be driven thereby, by means of a clutch 58 selectively actuable by means of an actuating arm 59. The arm 59 is moved by pneumatic cylinder 60. Accordingly the shaft 54 is selectively driven by the shaft 53 upon actuation of the cylinder 60. The shaft 54 is also attached to a disc 61 frictionally engaged by a pad 62. The pad 62 is selectively moved into engagement with the disc 61 by means of a pneumatic cylinder 63. The cylinder 63, in cooperation with a stop cylinder 64, defines the stop position of the arm 55. When the correct number of convolutions 38 are formed, the clutch 58 is disengaged and the disc 61 frictionally engaged by the pad 62 to slow the disc 61. Thereafter the cylinder 64 is actuated to move the stop member 65 into engagement with the arm 55 to hold the arm 55 at a predetermined position relative to the former 20. Accordingly, the convolutions 38 are formed by rotating the tube 57 around the central axis of the former 20. The arm 55 is selectively rotated by the motor 51.

So that the convolutions 38 are not stacked one upon the other, the arm 55 is moved longitudinally of the former 20 by means of a power screw 66 selectively engaged by a half-nut 67. The half nut 67 is selectively movable into engagement with the power screw 66 by means of a pneumatic cylinder 68. The power screw 66 is rotatably supported by the two sub-frames 58 and is fixed thereto so that interaction of the half nut 67 and power screw 66 causes movement of the sub-frames 50 along the rail 49. The power screw 66 is driven by a gear 69 meshingly engaged with a further gear 70 intermittently driven by a one-way clutch 71. The one-way clutch is rotatably driven by a lever 72 oscillated by a pin 73 received within a slot formed in the lever 72. The pin 73 is fixed to a further lever 74 which is pivotally mounted on a shaft 75. The lever 74 is movable transverse of the shaft 75 by provision of a slot 76. One end of the lever 74 is provided with a roller 77 which is resiliently biased towards the motor 51 and thus acts as a cam follower to follow the rotating cam 78. The cam 78 is rotatably attached to the shaft 53 so as to be driven thereby. The cam 78 has cam lugs which cause oscillation of the lever 74 and therefore oscillation of the lever 72. This oscillation of the lever 72 causes rotation of the gear 70 in a fixed direction determined by the one-way clutch 71. Accordingly, upon rotation of the shaft 53, and therefore the cam 78, the sub frames 50 will be caused to move along the rail 79 if the half nut 67 is engaged with the power screw 66. There is further provided a cylinder 79 which resets the winding assembly 76 when a new field winding is to be wound.

Accordingly, in operation of the winding assembly 36, the cylinder 79 is activated so as to move the sub-frames 50 to a position whereby the arm 55 is at one end of the former 20. In the present embodiment, the arm 55 would terminate at a position remote from the end of the former 20. It should also be appreciated that the motor 51 is continually rotating. When convolutions 38 are to be formed, cylinders 63 and 64 are operated to release the disc 61 and arm 55. Thereafter clutch 58 is engaged to cause rotation of the shaft 54. The cylinder 68 is also operated so that the half nut 67 engages the power screw 66. Accordingly, as the sub-frame 50 is moved and the arm 55 moved longitudinally of the former, the shaft 54 is also rotating thereby causing the convolutions to define a spiral extending along the former 20.

If so desired, the core 10 (FIG. 6A) could be provided with the insulating members 15 prior to being attached to the backing member 45. However, in the present embodiment an insulation insertion assembly 80 is provided. The insulation insertion assembly 80 not only inserts the insulating members 15, but also inserts the wedges 17. In operation the insulation insertion assembly 80 receives two strips 81 and 82 which are formed to provide the insulation members 15 and wedges 17. More particularly, the strip 81 is bent to a generally C-shape prior to being delivered to the insulation insertion assembly 80. Within the assembly 80, the strip 81 is cut to the correct length and bent back upon itself to form a generally U-shape. The strip 82 is also cut to length within the assembly 80 and formed into a V-shape to facilitate installation in the slots 12. The insulation members 15 are first inserted in the slots 12 and the appropriate slots 12 then oriented so as to be aligned with the former 20. After the field winding 11 has been inserted, the core 10 is again rotated to the correct position and the insulation wedges 17 inserted.

Although in FIG. 6A the core 12 is shown as being movable relative to a stationary insertion assembly 80 by means of the shaft 46 and indexing wheel 47, it will be appreciated by those skilled in the art that the necessary relative movement between the core 10 and the insertion assembly 80 can be achieved by leaving the core 10 stationary and moving the assembly 80 to align same with the slot 12 intended to receive the insulation member 15 and/or the wedges 17.

To aid in insertion of the insulation wedges in the slots 12, the press member 32 (FIG. 4) is provided with two blades 83 which follow the sides 24 of the body 21. These blades 83 ensure that all the field windings are located within the large slot portion 14. Additionally, the blades 83 have a tapered outer edge 84 which provides a tapered slot in combination with the field winding 11. This tapered slot facilitates insertion of the wedges 17 by engagement therewith.

When the required number of convolutions 38 is formed on the former 20, and the former 20 moved into alignment with the core 10, it is necessary to either clamp or sever the wire 18 to enable the next set of convolutions 38 to be formed. It is also necessary to hold the wire extending from the tube 57. To accomplish this there is provided an arm 85 which is retractable and extendable to the required position to hold the wire 18. When the former 20 is moved along the track 43 to a position aligned with the core 10, the wire 18 extends from the tube 85 to the new position of the former. This extension of wire is then clamped between the jaws 86 and 87 of the arm 85. Where it is desired to cut the wire 18 this is achieved by fully closing the jaws 86 and 87. A cutting blade 88 formed on one of the jaws 86 or 87 to assist the cutting action. Upon the former 20 returning to a position ready to receive more convolutions 38, the arm 55 is positioned so that the wire 18 is correctly aligned transversely of the former 20. While the convolutions 38 are being formed, the wire 18 is still held by the arm 85. When the correct number of convolutions 38 is formed, and the former 20 moved into alignment with the core 10, the arm 85 also moves to retain the wire 18 in the correct position. Once the field winding 11 is formed, the wire 18 is released and the arm 85 moved to a position whereby it can again engage the length of wire extending between the tube 57 and the newly formed field winding 11.

In order to keep the length of wire 18 joining windings which are electrically connected together, as short as possible it is desirable that the transfer assembly 37 be movable with the winding assembly 36. This movement can be brought about independently or by linking or mounting the two assemblies 36 and 37 together.

Turning now to FIGS. 7, 9, 10, 11 and 11a, wherein there is schematically depicted an insulation insertion assembly 99, to form and insert the insulation members 15. There is also depicted an assembly 100 to form and insert the insulation wedges 17. Firstly, with reference to FIG. 7, there is schematically depicted, a strip feed assembly 101 and a guillotine assembly 102 more fully depicted in FIG. 9. The strip feed assembly 101 includes a spigot 103 which receives a roll 104 of strip insulation material. As the roll 104 is rotated the strip 105 is removed therefrom to pass through a curling die 106 so that the strip 105 has its longitudinal edges bent back upon themselves so as to provide flaps 107. The strip 105 is fed in a direction from the die 106 to the guillotine assembly 102 by means of two clamps 108 and 109, with the clamp 108 reciprocally mounted and moved in coordination with the guillotine assembly 102. The clamp 109 is fixed stationary relative to the guillotine assembly 102. The clamp 108 can be moved by means of an interacting piston and cylinder and can be pneumatically operated. The clamps 108 and 109 are sequenced in operation so that only one of them is in clamping contact with the strip 105 at any given time.

In operation, the clamp 108 can be moved rightwardly so as to abut the adjustable stop 110 whereafter the clamp 109 is released and the clamp 108 actuated so as to engage the strip 105. Thereafter, the clamp 108 is moved leftwardly until it abuts the stop 111 thereby moving with it the strip 105. Upon the stop 111 being engaged the clamp 108 is released and the clamp 109 actuated so as to grip the strip 105. Subsequently the clamp 108 is then returned to the stop 110. In coordination with the feeding assembly 101, the guillotine assembly 102 is actuated to sever from the strip 105, portions of insulation material which are to be located in the slots 12 of the core 10.

It should be appreciated that the length of movement of the clamp 108 is egual to the amount of material removed by the guillotine assembly 102. The guillotine assembly 102 includes a blade 112 which is reciprocally mounted and moved by a piston and cylinder 113 (FIG. 9) which can be pneumatically operated. Extending from the piston and cylinder 113 is a push rod 114 which transfers motion to the blade 112. The blade 112 is provided with a shaped lower end 115 which both cuts the strip 105 and forms the strip 105 into the final shape depicted. Accordingly, the lower end 115 has a U shaped recess 116 which receives the portion of the strip severed from the strip 105 so as to deform it into the shape ready to be received in the slots 12. Located below the lower end 115 is a forming die 117 about which the severed portion is wrapped in forming into a generally U-shaped configuration to form the member 15.

Upon the member 15 being formed within the guillotine assembly 102, a push rod is activated which removes the member 15 from within the guillotine assembly and inserts it in the appropriate slot 12.

In FIG. 10 there is schematically depicted an alternate means of forming the insulation members 15. In the embodiment of FIG. 10, an insulation member 15A is formed in such a way as to obviate the need for the end cuffs 16. In this particular instance, the insulation member 15A is provided with ridges 118. The ridges 118 are formed in the strip 105 by a heated roller assembly 119. More particularly, the heated roller assembly 119 forms longitudinally extending ridges 120 in the strip 105 prior to it being delivered to the guillotine assembly 102.

In FIGS. 11 and 11a there is schematically depicted a method of forming the insulation wedges 17. The wedge formation and insertion assembly 100 is similar to the insulation insertion assembly 99. The assembly 100 is also provided with a spigot 121 which delivers a strip of plastics material 122 to two clamps 123 and 133 which operate in a similar manner to the clamps 108 and 109 of FIG. 7. The clamps 123 and 133 feed the strip 122 to a guillotine assembly 134 having a cutting blade 135 to form the leading tapered edge 136 on the insulation wedge 17. The guillotine assembly 134 has a blade 137 with a shaped protrusion 138 which cooperates with a shaped recess 139 to form the insulation member into a generally U-shaped transverse cross section. From the guillotine assembly 134 a push rod then moves the insulation wedge 17 into the appropriate slot 12.

Figure 8:
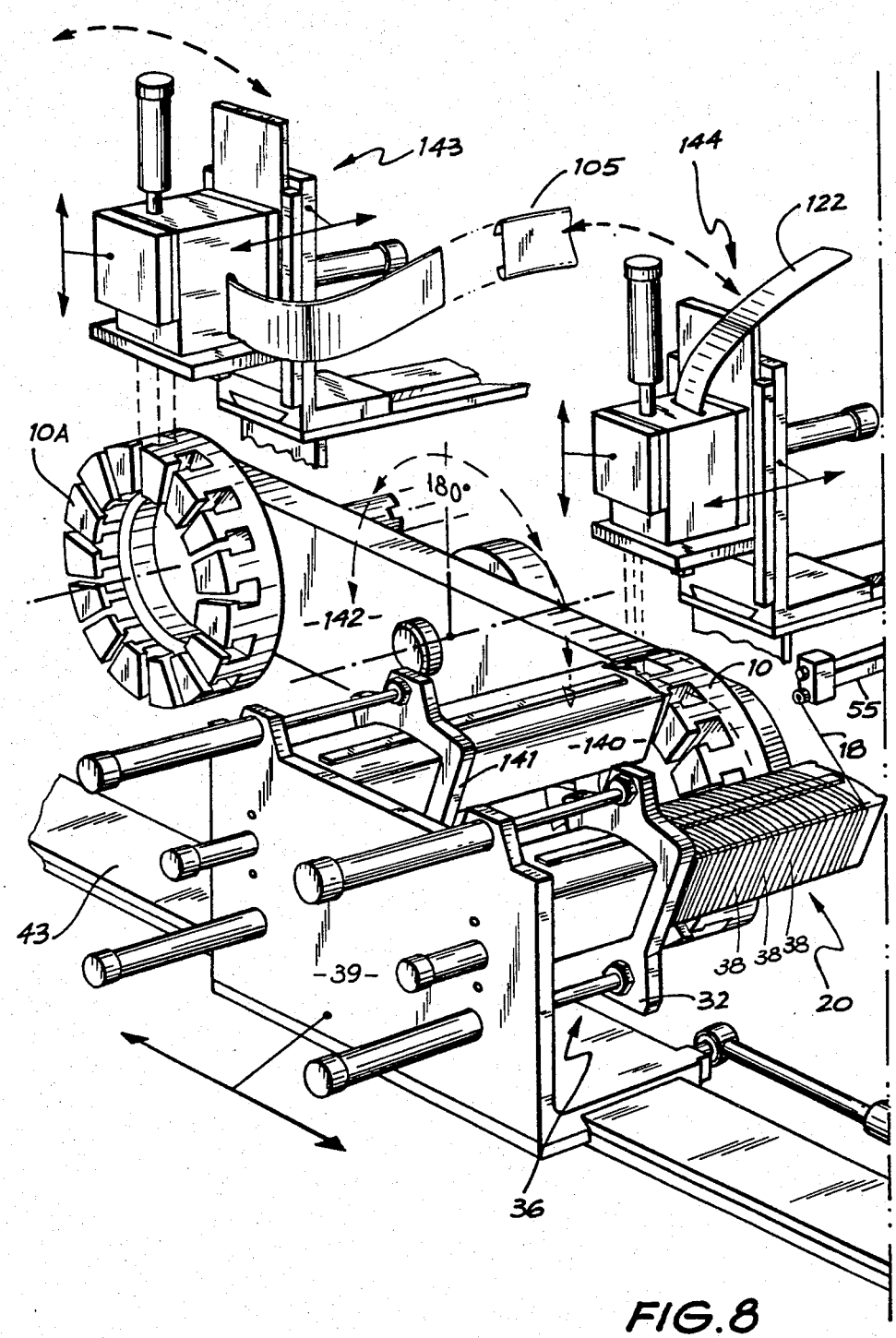
FIG. 8 is a schematic perspective view of a winding assembly similar to that depicted in FIG. 6a but provided with two formers.
Figure 9:
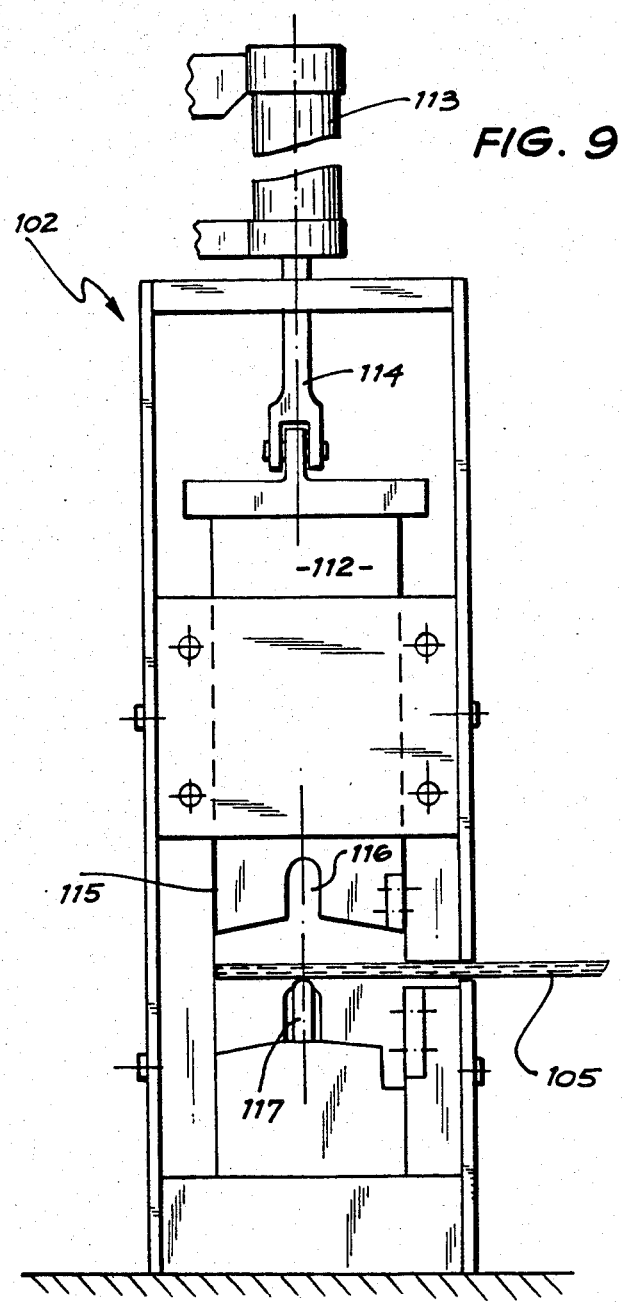
FIG. 9 is a schematic front elevation of a guillotine assembly to be used with the apparatus and method of FIG. 7.

Turning now to FIG. 8 wherein there is schematically depicted a multiple head arrangement which can aid in speeding up of the insertion of the insulation members 15 and wedges 17 as well as formation of the convolutions 38. The multiple head assembly 158 is to be used in conjunction with the winding assembly 36 of FIG. 6b. As can be seen from FIG. 8, the arm 55 delivers the wire 18 to the former 20 so as to form the convolutions 38 as previously discussed with reference to FIGS. 6a and 6b. However, in the present instance there is provided a second former 140 identical in construction to the former 20. The former 140 is also provided with a press member 141 operated identically to the press member 32 of FIG. 6a. The formers 20 and 140 are mounted on the common support 39 as discussed with reference to FIG. 6a. In the present embodiment, there is provided a pivoting backing member 142 which receives two cores 10 and 10A which are alternately placed to face one of the formers 20 or 140. Accordingly, the backing member 142 locates the cores 10 and 10A at one of two operating stations. At one of the operating stations, there is provided an insulation insertion and formation assembly 143 which can be constructed in accordance with the guillotine assembly 102 of FIGS. 7 and 9. However, the assembly 143 is movable in the direction of the arrows on FIG. 8 to enable pivoting movement of the backing member 142. Accordingly, at the station at which the assembly 143 is located, the insulation members 15 are inserted in the core 10A. At the other station there is located an insulation wedge insertion and formation assembly 144 which can be constructed in accordance with the guillotine assembly 134 of FIG. 11. Also at this other station, the convolutions 38 are pushed into the core 10 to form the field windings 11. It should also be appreciated that the assembly 144 is also movable in the direction of the arrows to enable pivoting movement of the backing member 142.

By providing two formers 20 and 140 (or some other higher member of formers mounted either independently or on the common support 39) the time required to form and insert the field windings 11 is shortened. More particularly, as a field winding is being located in the core 10, a further field winding is being wound on the other former and the insulation members 15 inserted in the other core 10A. Once one field winding 11 has been placed on the core 10, the backing member 142 is rotated so as to locate the other core at a position facing one of the formers 20 or 140. Also, once the field winding 11 has been placed on the core 10 the assembly 144 inserts the wedges 17.

It will be appreciated that the time of insertion can be further reduced if the assemblies 143 and 144 are able to move relative to the corresponding cores 10A and 10 so as to align the slots 12 to receive the insulation members 15 and/or wedges 17. This relative movement for ease of description and illustration is illustrated as being achieved by rotation of the cores 10, 10A but the alternative arrangement of movement of the assemblies 143 and 144 relative to a stationary core 10, 10A has been found in practice to be the faster alternative.

In FIG. 8 there is schematically depicted one means of providing a multiple head arrangement to receive two cores 10. It should be appreciated that the backing member 142 may be configured so as to provide two or more heads to support two or more cores 10. In such an instance it can, for example, be advantageous to arrange the formers 20 and 140 so that one receives and inserts running windings while the other one(s) form(s) and insert(s) starter windings which normally have a different number of convolutions. Alternatively, three formers 20 can, for example, be used to wind three place windings. It can also be advantageous to space the assemblies 143 and 144 at different stations depending on the number of heads provided on the backing member 142.

If so desired, the winding assembly 36 to be used in conjunction with the assembly of FIG. 8, can be mounted on a track 43 enabling movement of the winding assembly 36 in a direction transverse of the formers 20 and 140 to aid in rapid formation of the field windings 11. In addition, as explained above in relation to FIG. 6A, the core 10 is preferably movable with the longitudinal movement of the arm 55 to keep short the length of wire joining adjacent windings.

Figure 12:
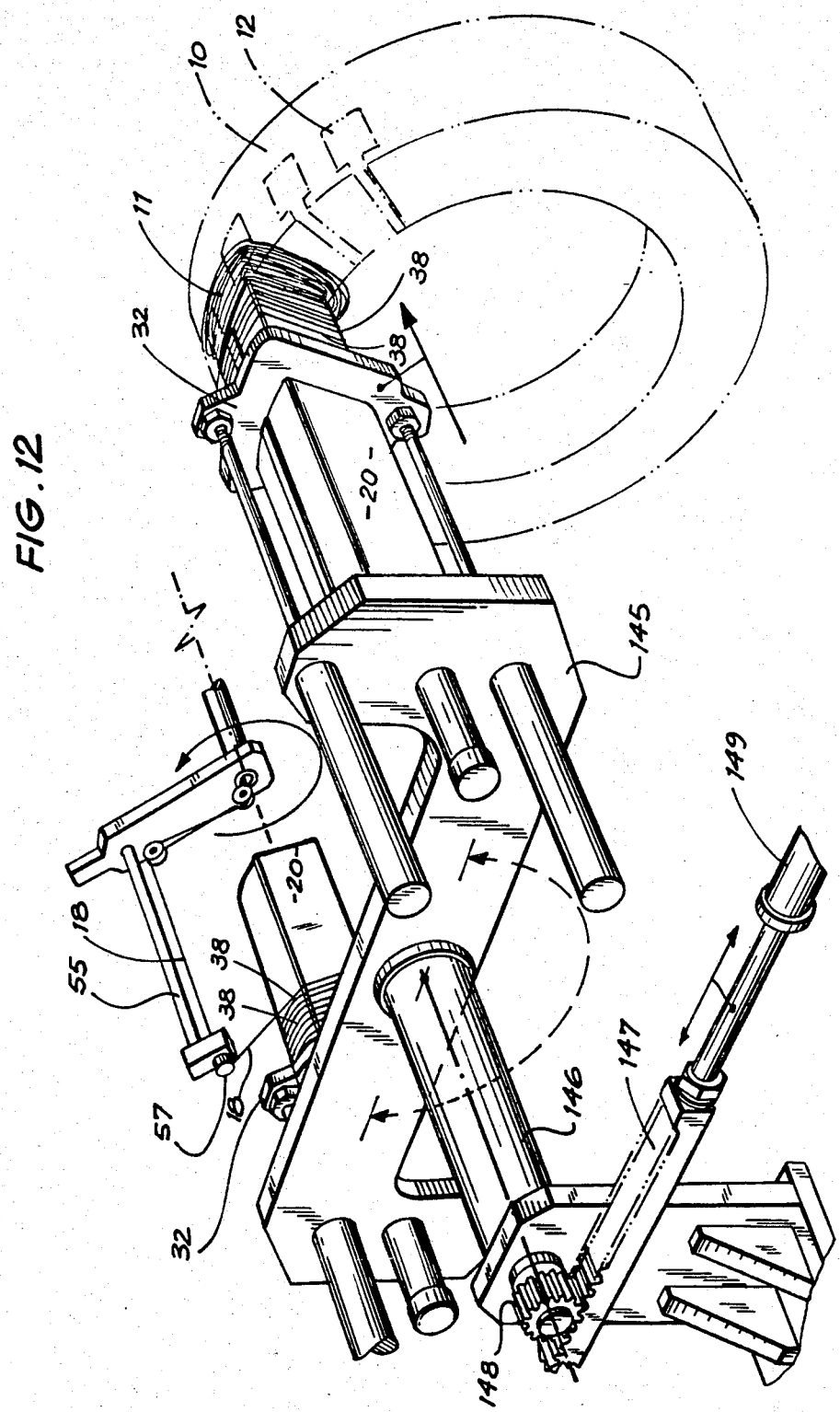
FIG. 12 is a schematic perspective view of a winding assembly to simultaneously form and insert field windings in the core of FIG. 1.

Turning now to FIG. 12 wherein there is schematically depicted a further means of providing one or more formers such as the former 20 of FIG. 3. In the present embodiment, two formers 20 are provided which are identical to the former 20 of FIG. 3. In each instance they are appropriately provided with a press member 32 identical to the press member 32 of FIG. 3. As can be seen from FIG. 12, the two formers 20 are mounted on a common support 145 rotatably mounted by means of a shaft 146. The shaft 146 is rotatably driven between two stations by means of a rack 147 and a pinion 148. The rack 147 is operated by a pneumatic cylinder 149. As the convolutions 38 are being formed on one of the formers 20, the convolutions 38 on the other former 20 are being pushed into the slots 12 of the core 10 to form the field windings 11. As each field winding 11 is formed, and the appropriate number of convolutions 38 formed on the other former 20, the support 45 is rotated through 180° to then again line up the empty former 20 with the winding arm 55.

As can been seen from FIG. 12, there are provided two formers 20 on a common support 145. It should be appreciated that the support 45 can be provided with two or more formers 20 and any number of desired arms 55 can interact therewith. Accordingly if so desired, one or more winding assemblies 36 can be also required.

Figure 13:
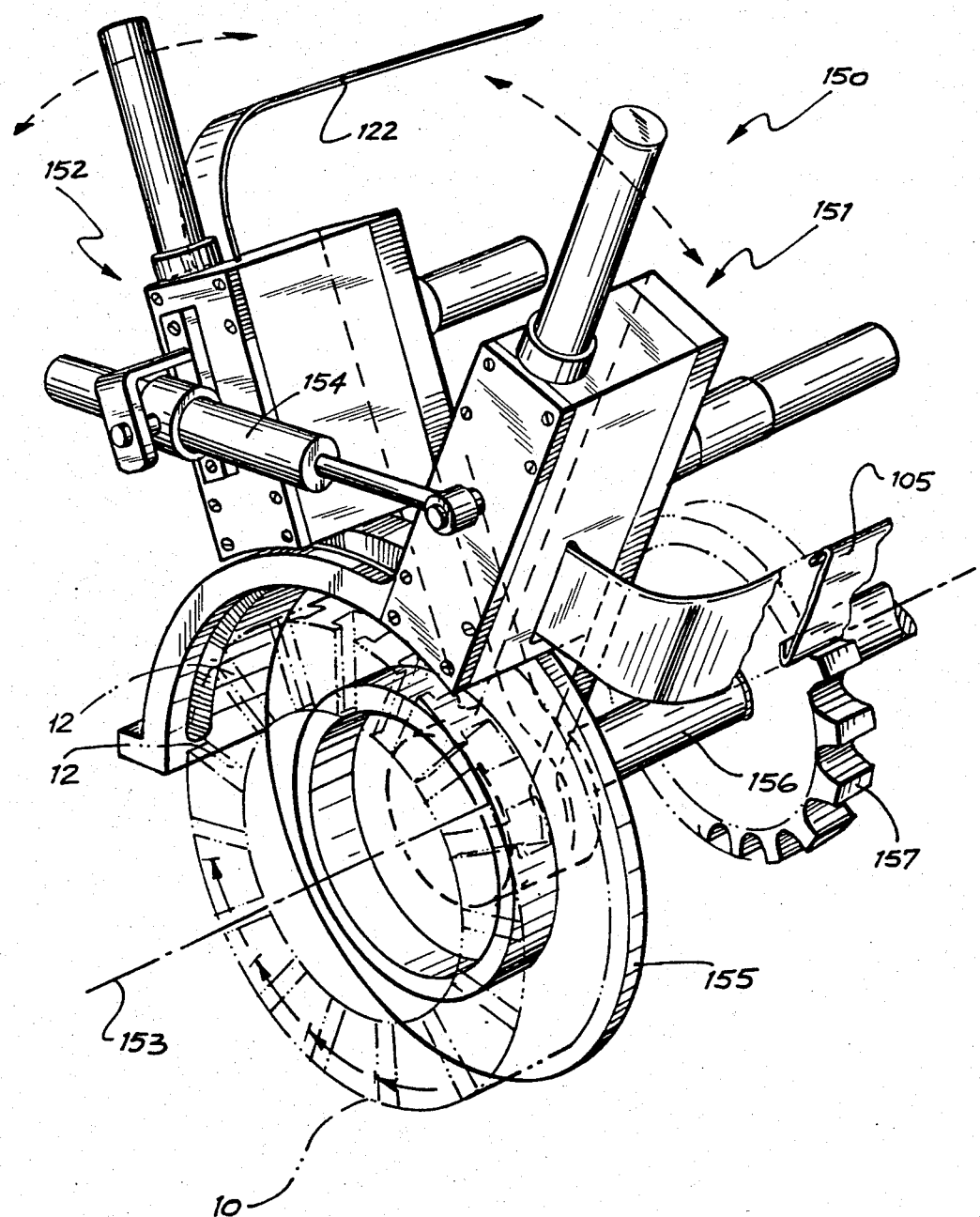
FIG. 13 is a schematic perspective view of an assembly to insert the insulation members and insulation wedges of FIGS. 7 and 11.

In FIG. 13 there is schematically depicted a combined assembly to enable the insulation members 15 and wedges 17 to be formed and inserted. The assembly 150 includes an insulation member formation and insertion device 151 which receives the strip 105 and forms the insulation members 15 substantially identically to the guillotine assembly 102 of FIGS. 7 and 9. The assembly 150 further includes a wedge formation and insertion device 152 which receives the strip 122 and forms and inserts the wedges 17 substantially identically to the guillotine assembly 134 of FIG. 11. However, the two devices 151 and 152 are angularly adjustable relative to each other about the axis 153 by a hydraulic cylinder 154 extending between the two devices 151 and 152. By actuation of the cylinder 154 the devices 151 and 152 can be adjusted to meet the angular spacing between the slots 12 in the core 10. The core 10 is placed on a backing 155 rotatably mounted by means of a shaft 156 and indexed by an indexing wheel 157. The assembly 150 can be used in conjunction with any of the devices described with reference to FIGS. 6a, 8 or 12.

Although the apparatus illustrated in FIG. 13 shows two dis-similar devices 151 and 152 for respectively inserting insulation members 15 and wedges 17 respectively, it is desirable to be able to substantially simultaneously insert a pair of wedges 17 so as to secure a winding in its slots 12 as soon as possible and without rotating the core 10. This desirable situation can be achieved by making the assembly 150 to include two wedge formations and insertion devices 152. The second of these devices 152 replace the device 151 as illustrated.

As a further alternative the assembly 150 can be provided with two devices 151, the second of which replaces the device 152 as illustrated. This arrangement permits a pair of insulation members 15 to be substantially simultaneously inserted in a corresponding pair of slots 12.

Furthermore, rather than providing the one cylinder 154 of FIG. 13, the devices 151 and 152 (or both 151 or both 152 as discussed above) can be independently movable about the axis 153, each being provided with its own cylinder or eguivalent arrangement.

It has been found advantageous to keep the face of the core 10 clear, to bend back the looped end turns of each of the field windings 11 to lie along the radially outer surface of the core 10. This can be accomplished by having further press member(s) positioned to engage the end turns of the field windings 11 to bend them back away from the face of core 10. It can be advantageous to clear the space to receive the insulation wedges 17, for example.

The foregoing describes only some embodiments of the present invention and modifications, obvious to those skilled in the art, can be made thereto without departing from the scope of the present invention.

What I claim is:

1. A method of forming and installing field windings in a core of an axial flux induction electric machine, said method including the steps of: providing a core wound from metal strip having holes formed along an edge thereof and spaced longitudinally of the strip so that said holes form radially extending slots in a radial face of the core, which slots are provided to receive field windings; spirally winding a length of wire about a former so that the wire forms a plurality of convolutions; aligning the former with two of the slots in said radial face so that the former extends generally normal to said face; and moving the convolutions from the former in said two slots so that the convolutions extend through and between said two slots to thereby form a field winding.

2. The method of claim 1 including the step of locating said convolutions between a terminal end of said former and a press member spaced from said end, locating said end adjacent said two slots and moving said press member along said former to move said convolutions from said former into said two slots.

3. The method of claim 2 including the step of placing said end of said former against said core so that ridges on said end of said core engage therewith to aid alignment of the former with the slots of the core.

4. The method of claim 1 including providing leading projections on said press member to engage said convolutions to thereby ensure location of the convolutions well within the slots.

5. The method of claim 2 further including the step of inserting insulation members in the slots prior to the convolutions being located therein, which insulation members are inserted by movement thereof in a direction radially relative to said core.

6. The method of claim 5 further including the step of inserting insulation wedges in said slots after said convolutions are placed therein so that said insulating members and insulation wedges insulate the field winding from the core, with said insulation wedges being inserted in a direction radially relative to said core.

7. The method of claim 1 wherein said former is held stationary when said convolutions are formed, and said convolutions are formed by movement of said wire about said former.

8. The method of claim 1 or 2 wherein said convolutions are formed by moving said wire spirally about the longitudinal axis of said former so that the convolutions are spaced along said former in an abutting relationship.

9. The method of claim 1 or 2 including the step of at least partly collapsing said former to facilitate removal of said convolutions therefrom into said slots.

10. The method of claim 5 including the steps of forming said insulation members from strip material by severing portions therefrom and bending said portions into a generally U-shaped configuration.

11. The method of claim 10 further including the step of forming said insulation members with end cuffs to abut the core to retain the insulation members in position.

12. The method of claim 6 including the step of forming said insulation wedges from strip material by cutting portions therefrom and forming said portions into a generally C-shaped configuration prior to insertion into the slots.

13. The method of claim 12 wherein said insulation wedges have a leading edge which is tapered in insertion thereof in the slot.

* * * * *